No. 766,186. PATENTED AUG. 2, 1904.
H. N. HAUG.
HOUSE FOR DRYING FISH, &c.
APPLICATION FILED MAR. 28, 1903.
NO MODEL.

Witnesses:

Inventor:
H. N. Haug.
by Henry L. Reynolds
Attorney

No. 766,186.                                                                 Patented August 2, 1904.

UNITED STATES PATENT OFFICE.

HAAKON NIKOLAI HAUG, OF CHRISTIANIA, NORWAY.

HOUSE FOR DRYING FISH, &c.

SPECIFICATION forming part of Letters Patent No. 766,186, dated August 2, 1904.

Application filed March 28, 1903. Serial No. 150,020. (No model.)

*To all whom it may concern:*

Be it known that I, HAAKON NIKOLAI HAUG, engineer, a citizen of the Kingdom of Sweden and Norway, and a resident of the city of Christiania, Norway, have invented certain new and useful Improvements in Houses for Drying Fish and the Like, of which the following is a specification.

The method usually employed for producing dried fish consists in spreading out the gutted and cleaned fish and exposing it to the influence of the atmosphere, the drying being effected by means of the warm summer air. The drying therefore depends not only upon the weather, but also upon the season, as it cannot take place in the winter.

My invention relates to an improved drying-house in the several rooms of which the fish is suspended in order to be dried by means of a current of dry air at a proper temperature passing through the said rooms. By this means the drying is rendered completely independent of the season or of wind and weather, so that a constant quantity of uniformly-dried fish can be delivered each day during the whole year. I also have found that the dry air in the drying-room destroys certain germs contained in the fish.

My invention is illustrated in the accompanying drawings, in which—

Figure 1:
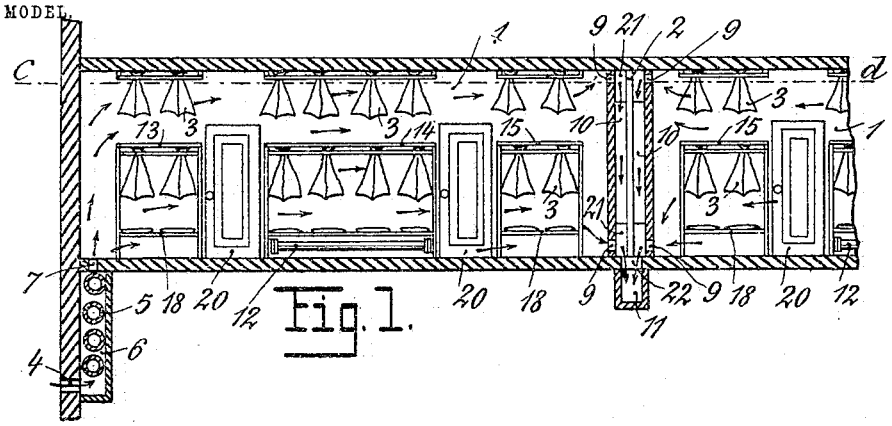
Figure 2:
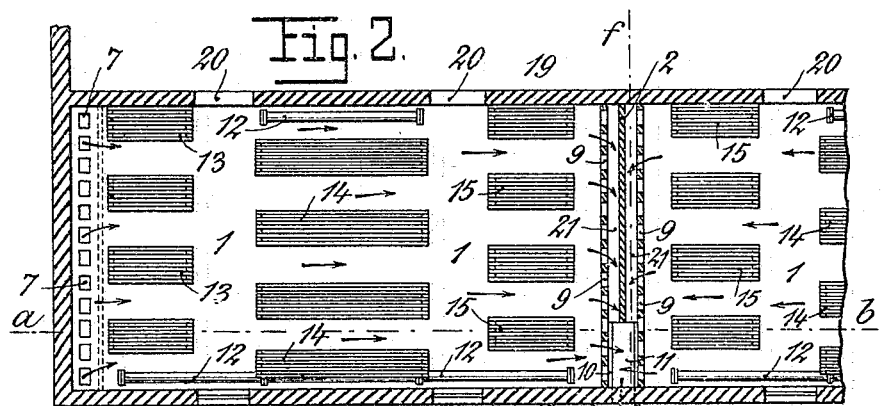
Figure 3:
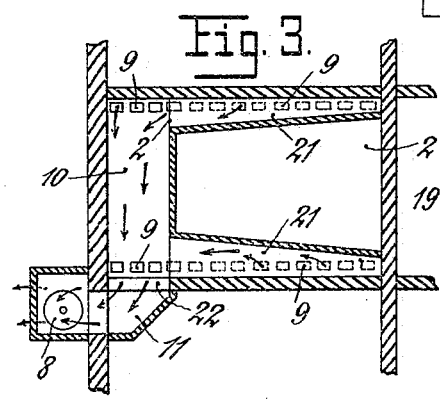
Figure 4:
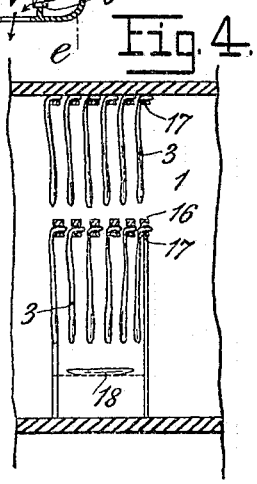

Figure 1 is a vertical sectional view on the line *a b*, Fig. 2, of a drying-house constructed according to my invention. Fig. 2 is a horizontal section on the line *c d*, Fig. 1. Fig. 3 is a cross-section on the line *e f* looking from the right in Fig. 2, and Fig. 4 is a sectional view of a detail.

Through the drying-rooms 1, in which the fish 3 is suspended with its flat side parallel to the longitudinal direction of the rooms, is passed a current of warm drying-air. It is found that in order to effect equal or uniform drying it is of great importance that the temperature of the drying-rooms should be uniform and that the warm air-current should pass over all the fish with the same velocity. For this purpose the outer atmospheric air is introduced through holes 4, Fig. 1, in the outer walls and passes into a heating-chamber 6, which is situated beneath the floor of the drying-room 1 and in which the air passes over a number of heating-tubes 5 in order to pass at a temperature of 20° to 30° centigrade into one end of the drying-room through apertures 7, uniformly spaced in the floor. A portion of the air as it enters passes along the floor, and part of it rises to the ceiling, as indicated by the arrows in Fig. 1. The air flows through the whole length of the drying-room and encounters the flat side of the fish 3, which is suspended on stands and from the ceiling, and the air is drawn by means of a fan 8, Figs. 2 and 3, through holes 9 at the other end of the drying-room near the ceiling and floor into an exhaust-chamber 10, from which through a channel 11 it passes, saturated with moisture, through the fan 8 out into the atmosphere.

In the drawings I have shown two drying-rooms 1 1, arranged one at each end of the house, longitudinally in a line with each other. These rooms are separated by means of a partition-wall 2, (see Figs. 2 and 3,) one side of which (the left-hand side in Fig. 3) forms an exhaust-chamber 10, which communicates with the exhaust-passages 21, arranged near the ceiling and floor at both sides of the wall 2. The said chamber 10 communicates through an opening 22 with the channel 11, leading to the fan 8. By this arrangement the two drying-rooms are provided with a common exhaust-chamber 10, with a fan 8, but with separate heating-chambers 6 at opposite ends of the rooms 1.

In this manner there is a constant current of air in the drying-rooms. As the cold outer walls, however, would cause the temperature of the air in proximity to them to be lower than that in the middle of the drying-rooms 1, this loss of heat must be compensated for, and this I preferably do by arranging heating-tubes 12 along the outer walls, the heating-surfaces of the said tubes being sufficient to make up for the loss of heat in the drying-rooms.

In order to obtain an equal saturation of the air which flows through the drying-rooms, all portions or strata of the air must pass the same quantity of fish. It is therefore important to distribute the fish equally in the rooms. In Fig. 2 three rows of suspension-stands 13, 14, and 15 are shown. The stands of each row are out of line with those of the next row, so as to alternate, as shown in Fig. 2, and the length of each of the stands 13 and 15 is half that of the stands 14. In the same manner the fish is distributed over the ceiling. By this means each vertical stratum of air which flows in a straight line through the rooms 1 is compelled to pass either two comparatively short stands and one long intervening space or one comparatively long stand and two short intervening spaces, and consequently pass in both cases over the same quantity of fish. The same action takes place with respect to the air flowing near the ceiling.

The fish 3, which is previously gutted and spread open by means of pins, is suspended upon the stands and from the ceiling, the tail being bent over and inserted between the top laths 16 of the stands and laths 17, fixed thereto, and also between the ceiling and similar laths 17, as shown in Fig. 4. The fish are thus arranged in vertical rows, and beneath the lowermost row very moist fish can be placed on netting 18.

The drying-rooms 1 are preferably arranged adjacent to the warehouse 19 or in suitable connection therewith. From the warehouse 19 the fish may be transported through doors 20 into the drying-rooms.

The heating-tubes are heated by means of high or low pressure steam or in any other suitable way.

Having now described my invention, what I claim as new, and desire to secure by Letters Patent, is—

A drying-room for fish provided with means for producing currents of drying-air therethrough and means for suspending fish therein consisting of parallel and superposed members slightly separated from each other and extending in pairs in the direction of the flow of air and adapted to receive the fish-tails therebetween in a horizontal position.

In testimony whereof I have hereunto affixed my signature, this 6th day of March, 1903, in the presence of two witnesses.

HAAKON NIKOLAI HAUG.

Witnesses:
RICHARD STOKKE,
AXEL LAHN.